May 22, 1956

F. M. ABBOTT ET AL 2,746,375

FLOUR BLEACHING APPARATUS

Filed Oct. 9, 1952

INVENTORS
FREDRIC M. ABBOTT
DENVER C. BALSLEY
HENRY F. BAMESBERGER

BY William C. Stuebes ATTORNEY

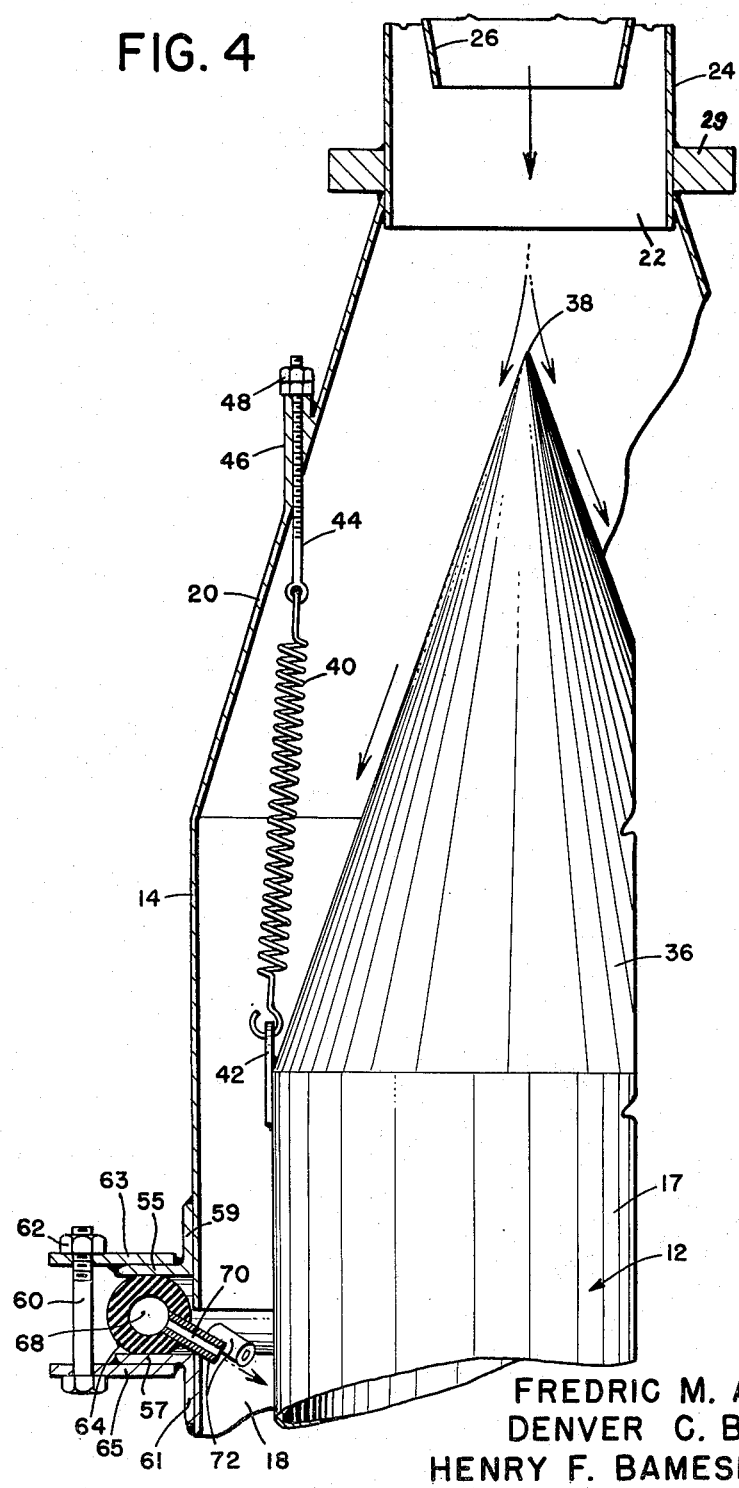

United States Patent Office 2,746,375
Patented May 22, 1956

2,746,375
FLOUR BLEACHING APPARATUS

Fredric M. Abbott, Monterey Park, Denver C. Balsley, Los Angeles, and Henry F. Barnesberger, Anaheim, Calif., assignors to General Mills, Inc., a corporation of Delaware Application October 9, 1952, Serial No. 313,886

12 Claims. (Cl. 99—263)

The invention relates to improvements in apparatus for the bleaching of flour by subjecting it to intimate contact with a bleaching gas.

In the manufacture of commercial flour, one of the important steps of the process is to subject the flour to a bleaching agent to remove the color and to turn it white. Through custom and habit, and perhaps the association of white with purity, the consumer, in many cases, demands that the flour be white, making it necessary to bleach the flour to satisfy competitive requirements. In order to obtain a uniform and thorough bleach the flour must be subjected to thorough contact with a bleaching agent for a certain period of time. A frequently used method is to create an atmosphere of bleaching gas and pass the flour in an agitated state through the gas. In some methods known to the art, the flour is subjected to mechanical agitation in the presence of bleaching gas, which necessitates the provision of operating machinery and power. Attempts have been made to successfully subject flour to the action of a bleaching gas by dropping it through a zone containing bleaching gas. As the flour is dropped, thorough contact between the flour and gas is had by the flour striking objects which cause dispersion, such as inclined surfaces which cause the flour to cascade back and forth. These devices often are very large in size to accommodate a satisfactory flow of flour without clogging and frequently do not bleach evenly as the flour is not evenly distributed through the gas as it passes through the distribution apparatus. Further, variances in flour flow often result in the clogging of the flow. The flour frequently concentrates itself in one location, causing clogging in one location and the resultant clogging of the whole apparatus.

Accordingly, an object of the present invention is to provide a bleaching apparatus which will uniformly and evenly bleach flour without requiring the provision of mechanically driven agitators for even distribution of the flour through a bleaching gas and which will handle a relatively heavy flow of flour distributing it thoroughly through the gas.

Another object of the invention is to provide a gravity flow flour bleacher which will not clog and which will automatically relieve itself of small concentrations of flour which would normally fill and clog the passageways through the bleacher.

Another object of the invention is to provide a gravity flow flour bleacher which will cause a complete and even distribution of flour through an atmosphere of bleaching gas to insure continuous adequate and even bleaching.

A still further object of the invention is to provide a bleacher formed with a hollow enclosing shell which is in sections and means for distributing a bleaching gas within the enclosing shell which also will serve as a sealing gasket to prevent the escape of bleaching gas from between the sections of the shell.

Other objects and advantages will become apparent in the following specification and claims, illustrated by the drawings, in which Figure 1 is a vertical elevation taken through the bleaching apparatus;

Fig. 4 is an enlarged vertical section of a portion of the bleaching apparatus showing details of several features.

Figure 1:
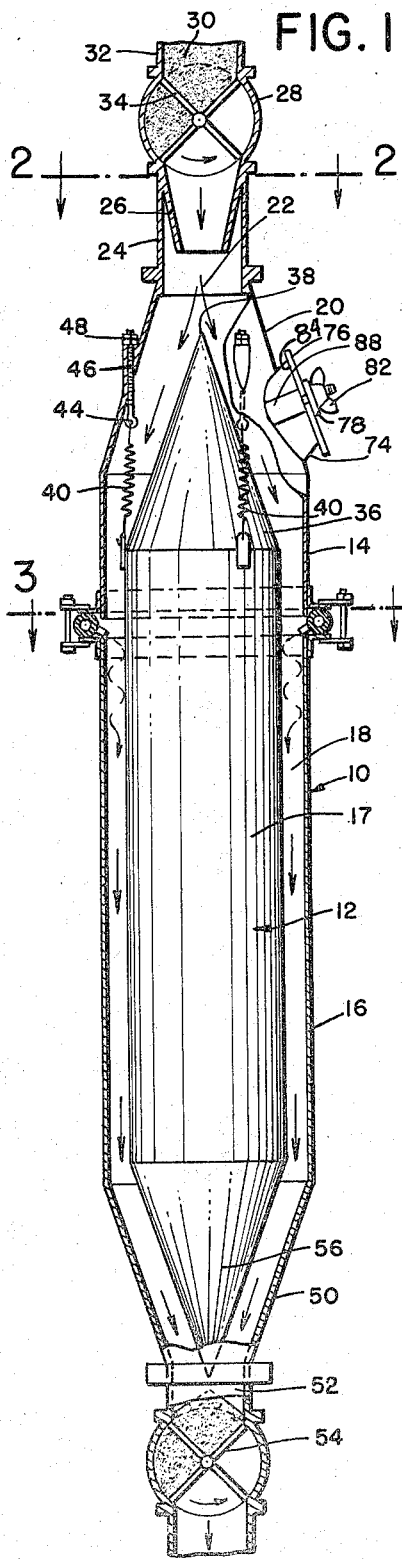

In the present invention contact between the flour to be bleached and the bleaching gas is obtained by dropping finely divided flour through a zone which contains an atmosphere of gas. The zone is defined, as shown in Fig. 1, between the interior surface of the wall of the enclosure shell 10 and the exterior surface of the flour dispersing or deflecting body 12, which is suspended within the shell. The deflecting body is rigid and may be made of material such as molded plastic or non-corrosive or coated metal not subject to corrosion from contact with bleaching gas.

Figure 2:
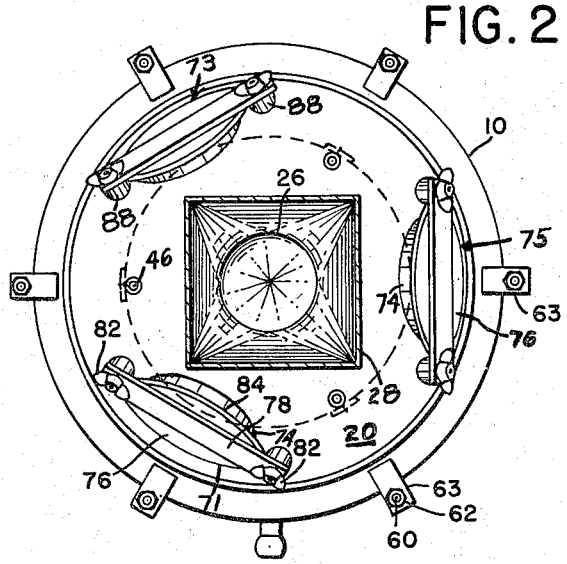
Fig. 2 is a sectional view taken along line 2—2 of Fig. 1.
Figure 3:
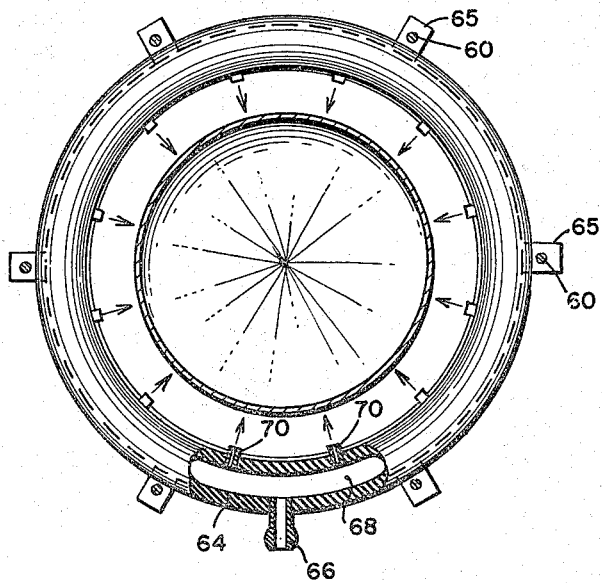
Fig. 3 is a sectional view taken along line 3—3 of Fig. 1.

The enclosing shell which forms a housing in which the flour is bleached, is formed by an upper section 14 and a lower section 16 which are joined together in a manner to be later described. The assembled enclosure shell has a central or main body portion which is cylindrical in shape, shown in Figs. 1, 2 and 3, and is positioned vertical in its normal operating position. The shell is preferably formed of a material such as coated or non-corrosive metal not subject to corrosion from contact with bleaching gas.

The flour dispersing body 12, suspended within the enclosure shell is torpedo shaped and has a central body section 17 which is also cylindrical in shape and which is normally positioned coaxial within the shell. The bleaching zone is primarily comprised of the annular space between the body portions of the enclosing shell and the central dispersing body. This zone is long enough to afford all the particles of the flour adequate time to intimately contact the bleaching gas while it is dropping through this zone.

To complete the enclosure, the upper and lower portions of the enclosure shell are tapering sections 20 which are conical in shape. The upper end has an opening 22 at the top through which the flour enters the shell and the lower end has an opening 52 through which the flour leaves the shell after being bleached. Extending above the upper opening 22 is a cylindrical extension 24 which receives the discharge end 26 of a rotary valve 28. A stiffener 29 surrounds the extension 24 for strength and for welding the sections together.

The rotary valve receives flour 30 through a flour supply pipe 32 and, as its cylinder 34 rotates, flour is dropped down through the valve discharge 26 into the enclosure shell. As is peculiar to the design of the rotary valve, the flour is gathered in the pockets or cut away portions of the cylinder 34 so that these small amounts will cause a pulsating or intermittent discharge of flour into the bleacher shell. This pulsating or intermittent feed of the bleacher is of importance in that they cause a continuous motion of the central dispersing body in a manner which will later be explained in detail. Although a rotary valve is preferred, various other devices yielding a varying rate of feed may be used. A screw conveyor, for example, might be used or a device specifically designed to yield a varying or pulsating rate of feed.

The design of the central flour dispersion member or torpedo 12 and its position and use relative to the remainder of the apparatus is basically directed at preventing concentrations of flour from shaking the mechanism and it also serves to obtain an even dispersion of flour so that good contact may be obtained between the flour and bleaching gas.

It is to be noted that the bleaching zone 18, which is annular in shape, is defined between two vertical walls, one wall being the cylindrical shell of the enclosure, the other being the exterior surface of the dispersing member 12. At the upper end of the vertical wall of the dispersing member, the vertical wall surface deviates to form an angle with the vertical wall, the angular surface being in the form of a cone 36, which is tapered to a peak 38 at its top. It is against this peak 38 that the flour is dropped to be divided and slid down the inclined surface of the cone 36. When the flour reaches the central cylindrical portion 17, it flows off the edge as a curtain of flour in a finely divided state to pass down through the bleaching zone 18.

The flour striking the peak 38 is evenly divided as it flows down the conical surface and the horizontal components of the force of the dropping flour are also equal around the axis of the central member. If, however, any large lumps of flour or concentrations fall to one side of the peak, there will be a resultant horizontal component of force which will tend to deflect the surface away from the concentration of flour. It is these concentrations which normally act to cause a clogging of a gravity feed flour bleacher. The clogging occurs at one location and generally builds up to result in the eventual clogging of the whole machine.

It is an important feature of applicants' mechanism that the central member, is freely suspended within the bleaching enclosure, thus permitting free lateral deflection when a horizontal force is exercised upon it. In other words, since the central deflecting member 12 is not restrained in a horizontal direction, flour falling unevenly on the tapered upward surface will cause sidewise movement of the central dispersing body. The movement of the body will change the space between the enclosure shell 10 and the surface of the body to tend to release any concentrations of flour which might momentarily be deposited or caught in the space. The free suspension of the central member permits it to have horizontal movement away from any concentrations of flour which form between the walls at any of the locations between the suspended rigid body and the shell.

To freely suspend the dispersing body 12, three tension springs 40 are triangularly arranged to support the body in the enclosure shell. The springs are hooked at their lower ends to clips 42, shown in detail in Fig. 4, which are suitably secured to the side of the dispersing body at the edge where the cylindrical surface meets the conical surface. The upper ends of the spring are hooked to eye-bolts 44 which extend through a hollow boss 46 mounted on the outer surface of the upper tapered end 20 of the enclosing shell. A pair of nuts 48 are threaded to the end of the bolt and adjustment of these nuts will serve to center the suspension of the dispersing body.

In addition to the free lateral movement afforded by the suspension of the dispersing body, the springs permit a vertical movement of the body. As the flour is dropped intermittently against the top of the dispersing body, it causes an expansion of the springs and a downward movement of the body. Between drops of flour the springs contract. Thus, with a continual feed of flour, a vertical oscillation is given to the central body. This oscillation causes a relative movement between the central body and enclosure shell, thus additionally preventing the opportunity of a build up of concentrations of flour and resultant clogging or choking. Flour dropping unevenly on the conical top or to one side of the peak will cause an extension of the supporting spring on that side, resulting in horizontal deflection of the central dispersing body yielding extra space to permit passage of the flour.

Therefore, it will be seen that the central torpedo-shaped dispersing body is mounted to have a continual vertical movement from the irregular admission of flour and that the body is also free to have lateral movement to release any concentration of flour which might occur. This combination of movements will prevent any clogging with a normal feed of flour, and will cause an improved dispersion of the flour through the bleaching gas.

At the lower end of the bleaching apparatus where the bleached flour is discharged and the enclosure shell 10 tapers inwardly the conically-shaped surface 50 leads to a tubular extension 52, having at its lower end a rotary valve 54. The rotary valve is the same size and is caused to rotate at substantially the same or slightly greater speed than the upper rotary valve so that the bleached flour gathering at the bottom will be removed. The rotary valve forms a seal at the lower end of the enclosure shell preventing the escape of bleaching gas into the surrounding air.

The lower end of the central torpedo-shaped dispersing body terminates in a cone-shaped surface 56 which leads directly from the central cylindrical portion 17. The surfaces of the conical tips 56 and 36 of the central torpedo are parallel at both ends 20 and 50 of the shell so that the central dispersing body is free to move sideways within the shell.

An important feature of the invention is the apparatus for introducing bleaching gas in the bleaching zone. For convenience of assembly, the enclosure shell 10 is made into sections, the upper section 14 and the lower section 16. This permits the central dispersing body to be made in one section and the apparatus is assembled by first suspending the dispersing body from its springs at the top and then placing the lower end of the shell over the dispersing body. For purposes of securing together the upper and lower sections of the shell, annular rings 59 and 61 are secured to the upper and lower sections and have outwardly extending flanges 55 and 57. To these flanges are secured projections 63 and 65 which are spaced from each other and have holes for bolts 60 to which are threaded nuts 62 to hold the shell sections together.

Advantage has been taken of the separation of the enclosure shell to provide a means for admission of a bleaching gas. A continuous annular tube 64 is provided having a slightly larger annular diameter than the enclosure shell so that it may be positioned between the flanges 55 and 57 of the annular rings 59 and 61, secured to the upper and lower sections of the shell. The annular tube serves both as a manifold or header for the bleaching gas and as a gasket sealing the shell from escape of gas. The tube is made of a resilient material, such as a hard rubber, which when the nuts 62 are drawn up on the bolts 60 seals itself securely against the brackets 49 to form a gasket.

In the outer face of the annular tube (Fig. 3) is an opening for supplying bleaching gas. A hollow pipe 66 is provided on the opening for attaching a gas supply hose. The bleaching gas is thus fed to the hollow 68 within the annular tube and passes through a series of inwardly directed openings 70 into the bleaching zone 18 of the enclosure shell. To direct the gas inwardly and downwardly small plastic nozzles 72 are inserted into the holes 70 and through their openings the gas is fed from the tubular manifold 64. These nozzles 72 are arranged in any desired number around the bleaching zone and direct the gas downwardly into the zone. The nozzles are directed slightly downwardly to insure distribution of the gas the full length of the zone although, during operation, the gas distributes itself throughout the entire space between the dispersing body and the enclosure shell.

Thus, in the arrangement shown the hollow annular-shaped tube serves as a manifold or header to distribute the bleaching gas entirely around the enclosure shell and also serves as a sealing gasket to prevent the escape of gas from between the sections of the shell.

To give manual access to the interior of the bleacher and for purposes of observation or checking whether gas is present within the bleacher, a group of handholes 71, 73 and 75 are positioned around the top of the enclosure shell. The handholes which are identical and in which like numbers indicate like parts (Figs. 1 and 2) are formed by an annular flange 74 which extends out from the tapered surface 20 of the enclosure shell. Against the edge of this flange is placed a cover 76 which has a bar 78 extending diametrically across its top to extend beyond the edge of the cover, for purposes of securing the cover to the hole. On each side of the handhole are welded studs 88 which extend through slots in the ends of the bars 78 to receive thumbscrews 82 which removably hold the cover in place. A gasket 84 may be placed around the upper edge of the handhole to insure a perfect gas seal. In addition to the handhole 71, which has been described, there are two other holes 73 and 75 evenly spaced around the enclosure shell, although any desired number may be provided.

Our invention provides a bleacher which requires the provision of a relatively small amount of space and which except for the rotary valve requires no power to operate, yet the apparatus insures a complete and uniform mixture between the bleaching gas and flour and yields an evenly bleached product. The freely and resiliently mounted dispersing body has free lateral movement combined with vertical oscillation during operation which gives a complete dispersion of flour. This combined movement prevents any clogging of flour in the apparatus and enables handling of uniform or fluctuating feeds.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. An apparatus for bleaching flour comprising in combination an enclosure shell in which flour is subjected to an atmosphere of a bleaching gas, means for injecting bleaching gas into the shell, a rigid body within the enclosure shell, means connected to the body freely suspending the rigid body within the shell capable of free lateral movement, means for introducing flour through an opening in the top of the shell to permit it to drop down and strike the rigid body to give motion thereto and be dispersed between the shell and body to pass through the bleaching gas and means at the bottom of the shell removing the flour as rapidly as it enters the shell at said top opening so that it will not pile up against said body.

2. An apparatus for bleaching flour comprising in combination an enclosing container in which intimate contact between a bleaching gas and the flour occurs, means for creating an atmosphere of bleaching gas within the container, a body having a conically-shaped top for evenly dispersing the flour, a support for the conically-topped body, said body being suspended from the support without lateral restraint within the container and for being capable of free lateral movement, means to feed flour to the bleacher by depositing it on the conical top of said body to give motion to the body, and means for removing flour from the bottom of the container as rapidly as it is deposited on said body, so that it will not pile up within the container.

3. An apparatus for bleaching flour comprising in combination a housing within which the flour is subject to contact with a bleaching gas, means for introducing gas into the housing, a rigid body having an inclined upper surface for deflecting the flour and being freely suspended within the housing, means in the top of the housing preventing the escape of gas and through which flour is introduced to strike the inclined surface and pass down through the bleaching gas, means for dropping the flour on the inclined surface to give motion to the suspended body, and means at the bottom of the housing for removing the bleached flour at the rate at which it is introduced at the top of the housing and preventing the escape of gas.

4. An apparatus for bleaching flour comprising in combination a hollow shell having a vertical cylindrical interior, a substantially cylindrically-shaped body coaxially suspended within the shell providing an annular bleaching passageway between them, the body being freely suspended to be free for unrestrained lateral movement, means for introducing a bleaching gas between the shell and cylindrical body to provide a bleaching atmosphere in the passageway through which the flour drops, means for dropping flour on the top surface of the cylindrical body to give motion to the body with the flour passing through the bleaching gas, and means for removing the bleached flour at a rate as fast as it was dropped into the shell after it has passed between the shell and cylindrical body.

5. An apparatus for bleaching flour comprising in combination a housing within which the flour is bleached, a deflecting body freely suspended within the housing to be capable of unrestrained lateral movement to free concentrations of flour between the body and the housing, means to drop flour at an uneven rate into the top of said housing on the suspended body, the flour being dropped at an uneven rate to cause an instability of the suspended body which aids in dispersing the flour, means to create an atmosphere of bleaching gas within the housing, and means to discharge the bleached flour from the housing as fast as it is dropped in the housing.

6. An apparatus for bleaching flour comprising in combination an enclosing shell in which the flour is subjected to a bleaching gas, a body freely suspended within the shell being capable of free lateral movement in response to a force having a horizontal component, means to inject a bleaching gas into the interior of the enclosing shell, a rotary valve positioned at the upper end of the enclosing shell above the freely suspended body to introduce unbleached flour into the shell by intermittently dropping the flour onto the freely suspended body to cause an unstable condition thereof to prevent concentrations of flour from jamming between the body and the shell, and means to discharge bleached flour from the lower portion of the shell after it has passed through the gaseous atmosphere within the shell as fast as it is dropped into the shell.

7. An apparatus for bleaching flour comprising in combination a hollow enclosure in which flour is subjected to an atmosphere of bleaching gas, means for creating the atmosphere of bleaching gas within the shell, a body resiliently suspended within the enclosure so that flour striking the body will cause motion of the body, the space between the body interior of the enclosure forming a bleaching zone, means for introducing flour into the top of the enclosure to drop down onto the resiliently suspended body and through the bleaching zone to contact the gas, and means for discharging the bleached flour from the lower end of the bleaching zone as fast as it is introduced into the enclosure.

8. An apparatus for bleaching flour comprising in combination a hollow enclosure in which flour is passed through an atmospheric bleaching gas, a body positioned within the interior and defining a bleaching zone between the body and the interior of the enclosure, means for introducing unbleached flour into the top of the enclosure to drop down and strike the body to pass through the bleaching zone, a spring means resiliently suspending said body within the enclosure so that the body has free movement when it is struck by the flour to prevent concentrations of flour from building up between the body and interior surface of the enclosure, means for introducing a bleaching gas into the enclosure, and means for discharging the bleached flour as fast as it is introduced into the top of the enclosure after it has passed through the bleaching zone.

9. An apparatus for bleaching flour comprising in combination an enclosure for passing flour through a bleaching gas, means for introducing the bleaching gas into the enclosure, a body suspended within the enclosure to define a bleaching zone between its exterior and the enclosure, spring means for resiliently suspending the body within the enclosure, means for introducing flour into the enclosure at a rapidly varying rate so that the force of the flour dropping on the body will vary to cause the body to have vertical oscillation to prevent the build up of concentrations of flour, and means for discharging the bleached flour from the enclosure as fast as it is introduced into the enclosure.

10. An apparatus for bleaching flour comprising in combination first and second mating enclosing shell members which when assembled form a housing within which flour is to be bleached, a bleaching gas supply manifold formed of a hollow tubing of resilient material with means for receiving gas within its hollow and for discharging gas into the enclosing shell members, the resilient supply manifold positioned between the first and second mating parts to form a gasket preventing the escape of gas from the shell, means to hold the shell members against the resilient manifold, means for introducing flour into the shell to contact the bleaching gas introduced through the manifold, and means for discharging the bleached gas from the shell.

11. An apparatus for bleaching flour comprising in combination shell members forming a housing for bleaching flour and having annular mating edges which join to complete the enclosing shell, an annular gas supply manifold formed of a hollow tube with a plurality of radial inwardly facing openings for distributing a bleaching gas to the interior of the shell and an outer opening through which gas is fed to the manifold, the manifold being clamped between the annular edges of the shell members to act as a gasket and prevent escape of gas, means for feeding flour for bleaching to the housing, and means for discharging the bleached flour from the housing.

12. An apparatus for bleaching flour comprising in combination an upper and lower shell member forming a housing for bleaching flour and being cylindrical in shape, tapering respectively to an inlet and an outlet opening, means for introducing flour through the inlet opening to pass through the shell to mingle with a bleaching gas, means for discharging the bleached flour through the outlet opening, an annular resilient hose forming a combination bleaching gas, manifold and gasket, the hose having an inlet for introduction of a bleaching gas and a series of radial openings facing inwardly into which are inserted gas nozzles which project into the interior of the shell, and means for clamping the upper and lower shell members against the annular manifold to seal the shell interior against escape of bleaching gas to the atmosphere.

References Cited in the file of this patent

UNITED STATES PATENTS

| Number | Name | Date |
|---|---|---|
| 227,376 | McCoy | May 11, 1880 |
| 1,732,442 | Jaeger | Oct. 27, 1929 |
| 1,914,342 | Larsen | June 13, 1933 |
| 2,174,348 | Damond | Sept. 26, 1939 |
| 2,259,453 | Beyer et al. | Oct. 21, 1941 |
| 2,419,876 | Birdseye | Apr. 29, 1943 |
| 2,605,743 | Scott | Aug. 5, 1952 |

FOREIGN PATENTS

| 14,383 | Great Britain | June 29, 1896 |